May 5, 1959

R. R. McCULLY ET AL 2,885,181

SUPPORT-JACK

Filed Aug. 13, 1956

INVENTORS
ROBERT R. McCULLY +
JAMES W. McDUFFIE

Joseph Allen Brown
ATTORNEY

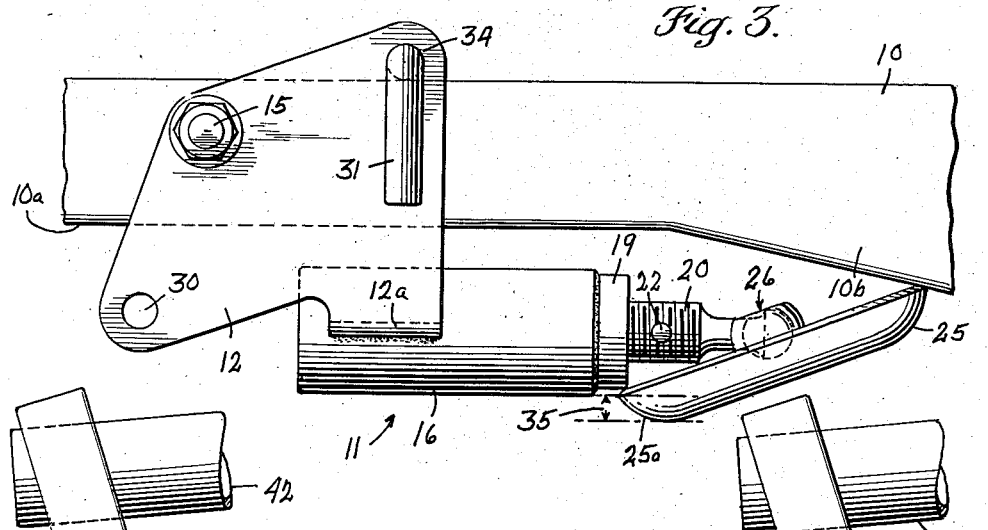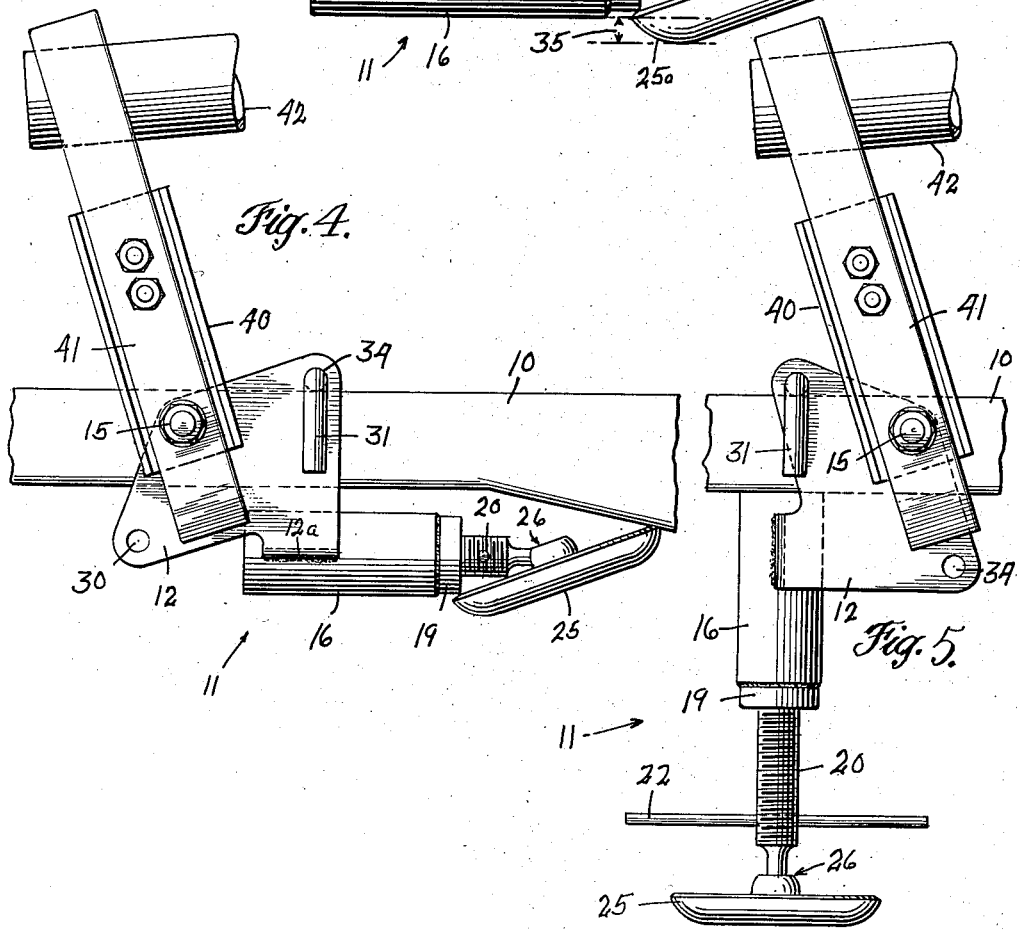

United States Patent Office 2,885,181
Patented May 5, 1959

2,885,181

SUPPORT-JACK

Robert R. McCully and James W. McDuffie, New Holland, Pa., assignors to Sperry Rand Corporation, New Holland, Pa., a corporation of Delaware Application August 13, 1956, Serial No. 603,617

2 Claims. (Cl. 254—86)

The present invention relates generally to jacks, and more particularly, to a mounted support-jack for use under the tongue of an implement adapted to be towed behind a tractor or other vehicle.

An agricultural implement such as a power take-off hay baler is provided with a tongue having a jack for supporting the tongue above the ground when the baler is not in use. The jack supports the tongue at a desired elevation so that when the baler is to be used, the tractor may be backed up to the tongue and readily connected thereto. After the tongue is connected to the tractor, power connections between the tractor and baler are made and the jack is retracted to a transport position to get it out of the way.

Conventionally, such a jack is provided with a ground engageable base member fixed to the bottom of the jack. When retracted, the jack is positioned to extend parallel to the implement tongue, and the base member extends generally perpendicular to the ground. In some mountings, the base extends below the body of the jack and the tongue a considerable amount. Since the clearance between the tongue and the ground is limited, the base sometimes digs into high spots in a field or contacts rises in a road when the implement is towed from place to place.

Engagement of the jack with the ground when the jack is not in use is obviously undesirable. One object of this invention, therefore, is to provide a jack, for an implement tongue, having a base which folds up when the jack is in retracted or transport position to thereby provide maximum ground clearance.

Another object of this invention is to provide a jack which extends beneath the tongue, which it is adapted to support, and parallel thereto when in retracted position, the jack having a base provided with an arcuate portion disposed to extend a slight amount below the body of the jack when the jack is retracted to provide a smooth, runner surface which will slideably engage high spots in a field or road when such high spots cause a ground clearance problem.

Another object of this invention is to provide in a tongue jack of the character described, improved and simplified means for setting the jack, selectively, in extended or retracted position.

A further object of this invention is to provide bracket means for connecting a jack of the character described to an implement tongue, there being a pivotal connection between the bracket means and the tongue so located that it may also be used as a pivot point for the bearing of a support for a power take-off U-joint drive line, the support bearing and bracket means being disposed so as to not interfere with each other.

A still further object of this invention is to provide a jack structure having few parts of simple design thereby enabling manufacture and assembly of the jack at very low cost.

Other objects of this invention will be apparent hereinafter from the specification and from the recital in the appended claims.

In the drawings:

Fig. 3 is a view similar to Fig. 1, but showing the jack in retracted position;

Fig. 4 is a fragmentary side elevation of the jack in retracted position, as in Fig. 3, there being shown a bearing straddling the bracket support means for the jack and pivoted on the same pivot about which the jack swings; and, Fig. 5 is a view similar to Fig. 4, but showing the jack in extended position and illustrating how the bearing does not interfere with the operation of the jack.

Figure 1:
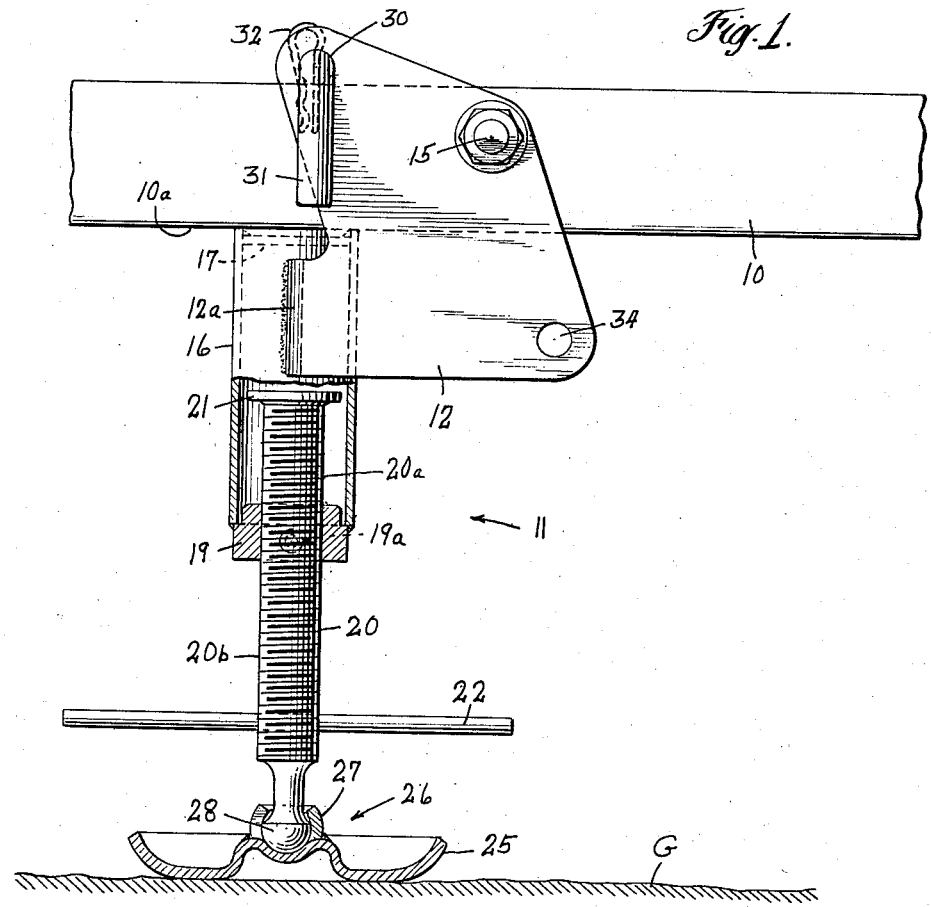
Fig. 1 is a part side elevation part section showing, fragmentarily, an implement tongue supported by a jack constructed according to one embodiment of this invention.
Figure 2:
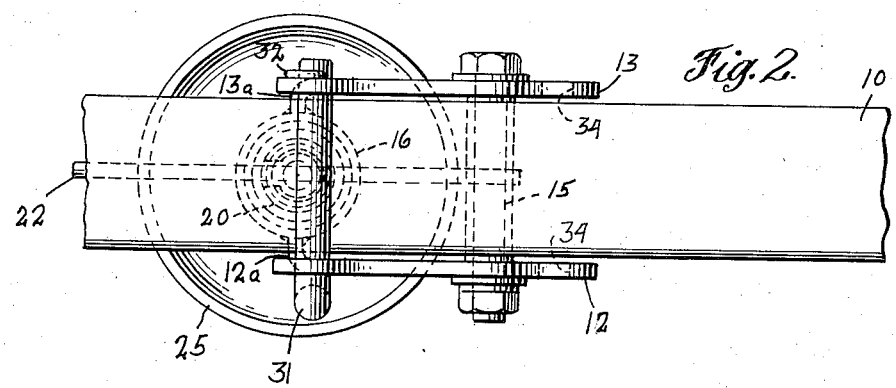
Fig. 2 is a plan view of Fig. 1.

Referring now to the drawings by numerals of reference, and first to Figs. 1–3, inclusive, 10 denotes a tongue of the type employed in connecting an implement to a tractor. The tongue is rectangular in cross-section; and the left hand end of the tongue, as shown in the drawings, is the end which connects to the tractor. Pivotally mounted on tongue 10 is a support-jack 11 constructed according to this invention.

Support-jack 11 comprises a pair of spaced bracket members 12 and 13, one on each side of tongue 10, which are pivotally connected to the tongue by nut-bolt 15. Interposed between the respective brackets is a tubular body member 16 which extends below tongue 10. The brackets have inturned portions 12a and 13a, respectively, which are welded to the body member. Body member 16 is closed at one end by a cross-member 17; and, its opposite end has an internally threaded collar 19 welded to it. Extending through collar 19 is a jack-screw 20 having a portion 20a within body member 16 and a portion 20b projecting outwardly thereof. Portion 20a has a washer 21 welded to it which projects radially of the jack-screw to prevent the screw from being threaded all the way out of collar 19. The diameter of the washer is such, however, to provide considerable clearance between the periphery of the washer and the bore of the body member so that the screw may be readily rotated. For rotating the jack-screw, a rod 22 is provided which extends diametrically through a suitable hole in portion 20b of the screw. A grease zerk 19a is provided in collar 19 to facilitate internal lubrication of the collar.

The support-jack has a dish-shaped base 25 engageable with the ground G and universally connected to jack-screw 20 by ball and socket connecting means 26, the base being provided with the socket 27 and the jack-screw of the ball 28. This ball and socket connection is such that base 25 may rotate freely and its area of contact with the ball 28 is great enough to insure that the base will not fall from the jack-screw when the jack is in raised, transport position (Fig. 3).

When support-jack 11 is pivoted to extended or supporting position, as shown in Fig. 1, the end of body member 16 opposite collar 19 abuts against the bottom face 10a of tongue 10; and, when in this position, portions of the brackets 12 and 13 project above the tongue. Each upwardly projecting portion of each bracket has a hole 30. These holes in the respective brackets are axially aligned and an L-shaped lock pin 31 is extendable through them to lock the jack in supporting position. Pin 31 is adapted to be secured in place by a cotter pin 32.

When tongue 10 is attached to a tractor and the implement to which it is connected is to be used, support-jack 11 is adapted to be retracted to get it out of the way by removing cotter pin 32 and pin 31 and swinging the jack upwardly about its pivot 15 to the position shown in Fig. 3. After the jack has been so pivoted, holes 30 are shifted to a point below tongue 10 and a second pair of aligned holes in brackets 12 and 13, namely, holes 34, are located above tongue 10. Pin 31 is adapted to be inserted in holes 34 to lock the jack in elevated position, cotter pin 32 being again used to hold the lock pin in place.

When in elevated position, the support-jack extends below tongue 10 a very small distance compared to the distance of downward extension of jacks of prior design. Base member 25, being freely swingable about the ball and socket connection 26 assumes a position as shown in Fig. 3, that is, folded up against the jack-screw 20 and abutting against rearward portion 10b of the tongue. Base member 25 has a small arcuate portion 25a which extends below body 16 a distance indicated by the arrows 35. If a high spot is encountered when the implement is being towed along a road or across a field, the curved portion 25a of the base member will engage this high spot and easily slide over it. No digging into the high spot will result. As a result, neither the base of the jack nor the jack itself will be damaged.

It will thus be seen, that by applicants' invention, maximum ground clearance is obtained when the support-jack is retracted to transport position, and in the rare instances where the support-jack may come in contact with the ground, the base member 25 provides a smooth runner surface for such contact.

The over-all structure of the support-jack is of utmost simplicity, enabling it to be manufactured at very low cost. Assembly is quick and easy. The cross-member 17 of body member 16 seals one end of body member 16. Collar 19 and the jack-screw 20 close the other end. As a result, no dirt or moisture is able to accumulate in the body, and eventually cause corrosion and binding in the jack. The grease zerk 19a is so disposed that the jack may be readily lubricated regardless of whether the jack is in extended or retracted position.

The power take-off drive means from the implement to the tractor must be supported along its length at a point along the connecting tongue. Conventionally, a pivoted bearing is provided for such supporting. Referring now to Figs. 4 and 5, it will be seen that bracket members 12 and 13 are so designed that a bearing 40 may straddle the bracket members and be pivoted about 15 the same as the jack yet not disturb the operation of the jack. Bearing 40 carries adjustable members 41 which support the p.t.o drive line, denoted 42. Whether the jack 11 is extended or retracted, the bearing 40 in no way affects the operation of the jack. The holes 30 and 34 in the respective brackets 12 and 13 assume positions on opposite sides of the bearing, depending on whether the support-jack is extended or retracted. Moreover, even when the support-jack is in locked position, the bearing 40 is permitted a considerable range of movement before it engages the lock pin.

While the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described our invention what we claim is:

1. A generally vertically extendable and horizontally retractable support jack for an implement tongue, comprising a body member, a pair of bracket members rigidly affixed to one end of said body member and extending upwardly relative thereto when the body member is vertically extended, said pair of members being spaced to straddle said tongue, a jack screw threadable into the end of said body opposite said one end, a ground engageable base member, means universally connecting said base member to said jack screw, means pivotally connecting said pair of members to said tongue, said base member being engageable with the ground when the support jack is in extended position and when the support jack is retracted pivoting about said universal connecting means and being projectable below said tongue to provide a high ground engageable runner, one bracket member of said pair of members having a pair of holes in alignment with a similar pair of holes in the other bracket member, and a removable lock pin adapted to project through one hole in each bracket member when the support jack is in extended position and through the other hole in each bracket member when the support jack is in retracted position to lock the support jack in its respective positions, said pin abutting against said tongue in either position of said support jack.

2. A generally vertically extendable and horizontally retractable support jack for an implement tongue, comprising a tubular body member closed at one end, a pair of bracket members rigidly affixed to said one end and extending upwardly relative thereto when the body member is vertically extended, said pair of members being spaced to straddle said tongue, a jack screw threadable into the end of said body opposite said one end, a ground engageable base member, means universally connecting said base member to said jack screw, means pivotally connecting said pair of members to said tongue, said base member being engageable with the ground when the support jack is in extended position and when the support jack is retracted pivoting about said universal connecting means and being projectable below said tongue to provide a high ground engageable runner, one bracket member of said pair of members having a pair of holes in alignment with a similar pair of holes in the other bracket member, a removable lock pin adapted to project through one hole in each bracket when the support jack is in extended position and through the other hole in each bracket when the support jack is in retracted position to lock the support jack in its respective positions, said pin abutting against said tongue in either position of said support jack, said body member extending below said tongue when the support jack is extended and retracted and said one end engaging the bottom of the tongue when the support jack is extended.

References Cited in the file of this patent

UNITED STATES PATENTS

| | | |
|---|---|---|
| 2,683,277 | Bernaerts | July 13, 1954 |
| 2,784,985 | Schnell | Mar. 12, 1957 |